United States Patent
Klamt et al.

[11] Patent Number: 5,862,213
[45] Date of Patent: Jan. 19, 1999

[54] CIRCUIT ARRANGEMENT FOR GENERATING CHARGE PULSES

[75] Inventors: Werner Klamt, Algermissen; Thomas Bratschke, Garbsen, both of Germany

[73] Assignee: Alcatel, France

[21] Appl. No.: 788,875

[22] Filed: Jan. 21, 1997

[30] Foreign Application Priority Data

Feb. 1, 1996 [DE] Germany ............... 196 03 530

[51] Int. Cl.$^6$ ............... H04M 1/00; H04M 15/00
[52] U.S. Cl. ............... 379/413; 379/400; 379/401; 379/124
[58] Field of Search ............... 379/124, 318, 379/362, 418, 340, 307, 322, 323, 324, 348, 347, 400, 394, 404, 398, 143, 146, 154, 113, 114

[56] References Cited

U.S. PATENT DOCUMENTS

| | | | |
|---|---|---|---|
| 4,485,270 | 11/1984 | Honda et al. | 379/124 |
| 4,638,122 | 1/1987 | Siligoni et al. | 379/124 |
| 4,720,852 | 1/1988 | Siligoni et al. | 379/124 |
| 5,172,407 | 12/1992 | Alenius | 379/124 |
| 5,452,345 | 9/1995 | Zhou et al. | 379/124 |
| 5,625,685 | 4/1997 | Allegranza et al. | 399/399 |

FOREIGN PATENT DOCUMENTS

| | | |
|---|---|---|
| 3636563 | 5/1988 | Germany . |
| 3516007 | 1/1994 | Germany . |

*Primary Examiner*—Daniel S. Hunter
*Assistant Examiner*—Charles N. Appiah
*Attorney, Agent, or Firm*—Ware, Frssola, Van der Sluys & Adolphson LLP

[57] ABSTRACT

A circuit arrangement for generating charge pulses during digital telecommunications is indicated, whereby subscribers (Tln) of a telephone network are connected by cables with an exchange. The subscriber telephones are connected by electric service lines to an interface unit that is connected to the exchange. The interface unit has a digital interface on the exchange side and at least one analog interface on the subscriber side. A generating circuit (3) is located in the interface unit and produces charge pulses as a function of signals transmitted by the exchange, the charge pulses being transmitted to the respective subscriber (Tln). When loop current flows through the electric circuit of each subscriber (Tln) telephone, the interface unit measures an input voltage that is proportional to the length of the service line. The thus gained voltage value is used to adjust the voltage level of the charge pulses produced by the generating circuit (3).

11 Claims, 2 Drawing Sheets

CIRCUIT ARRANGEMENT FOR GENERATING CHARGE PULSES

BACKGROUND OF THE INVENTION

1. Technical Field

The invention concerns telecommunications, and more particularly, the generation of charge pulses for transmission to respective telephone network subscribers.

2. Description of the Prior Art

A circuit for generating charge pulses for indicating telephone charges during analog telecommunications is known from German patent document DE 35 16 007 C2. A telephone exchange controls a corresponding charge indicator by means of special charge signals via telephone lines. To adapt the charge signal level to the user line and to its specific total impedance, a signal which is an image of the total call signal and the charge signal is obtained from a point in the circuit. The thus obtained total signal is rectified and supplied to a comparator, which compares it with a reference signal. If the amplitude of the rectified signal is greater than the amplitude of the reference signal, a signal is generated whose level is kept constant with the use of a memory element.

With digital telecommunications, such as the digital telecommunications disclosed in German patent document DE 36 36 563 A1, the telephone exchange is unable to transmit 16 kHz charge pulses. Instead, a charge pulse must be generated after a corresponding signal is received directly by the subscriber or by an interface unit (SU), to which the subscriber's telephone is connected through an electrical service line. The subscriber's telephone must receive a sufficiently high voltage, for example 140 mV, from the interface unit, even with a maximum length of the service line between the interface unit and the subscriber's telephone. To that end the interface unit must generate a charge pulse with a level of 4.2 Volt for example. With a charge pulse of this level, the maximum length of the service line is then for example 4.5 km with a cable containing 0.4 mm diameter conductors.

On the one hand, all elements of the interface unit including the power source or power sources must be designed for maximum voltage. On the other, the extreme case of no-load running must be taken into consideration if a very high-impedance telephone with a very short service line is directly connected at 16 kHz to the interface unit. Problems with respect to the interface unit do not take place when such a high voltage pulse is transmitted to a telephone, provided that a maximum length service line interconnects the telephone to the interface unit. The impedance of such maximum length service lines represents a sufficient "load" for the interface unit. However, in shorter service lines, the control range of the power source of the respective subscriber can be exceeded by the alternating-voltage amplitude provided by the service line from the interface unit. This happens for example with the above-mentioned no-load running when the sum of the supply voltage of the telephone and its superimposed alternating-voltage for the charge pulse reaches or even exceeds the controlled bias voltage of the power source.

SUMMARY OF THE INVENTION

Objects of the invention include an improved circuit arrangement for generating charge pulses for indicating call charges in a way so that telephones interconnected to an interface unit using any length of service lines can be operated without disturbing the interface unit.

According to the present invention, a circuit arrangement for generating charge pulses during digital telecommunications is provided, whereby subscribers of a telephone network are connected to a central station by cables, where the subscriber telephones are connected by electric service lines to an interface unit connected to the exchange, the interface unit including a digital interface on the exchange side and at least one analog interface on the subscriber side, and where a generating circuit located in the interface unit produces charge pulses as a function of signals transmitted by the exchange, which are transmitted to the respective subscriber, wherein when loop current flows through the electric circuit of each subscriber telephone, the interface unit SU measures a voltage that is proportional to the length of the service line, which is derived from the required supply voltage of a power source connected to the service line, and the thus gained voltage value is used to adjust the voltage level of the charge pulses produced by the generating circuit.

With this circuit arrangement, the level of the charge pulses is measured as a function of the respective service line length. This ensures that the alternating-voltage amplitude of the charge pulses from the generating circuit is always adjusted to a permissible value. Thus, the control range of the power source for the loop current cannot be exceeded. Furthermore, with this circuit arrangement the modulation of the loop current supply can be approximately halved. This can also halve the required voltage difference between the bias voltage of the power source and the telephone supply voltage. Another advantage of this circuit arrangement is the good reproducibility of the different charge pulse levels in series production. The circuit arrangement is especially advantageous with short service lines and with telephones which are directly connected to an interface unit.

The invention will be fully understood when reference is made to the following detailed description taken in conjunction with the accompanying drawings.

BRIEF DESCRIPTION OF THE DRAWINGS

A configuration example of the subject of the invention is illustrated in the drawings, where.

DETAILED DESCRIPTION OF THE INVENTION

Figure 1:
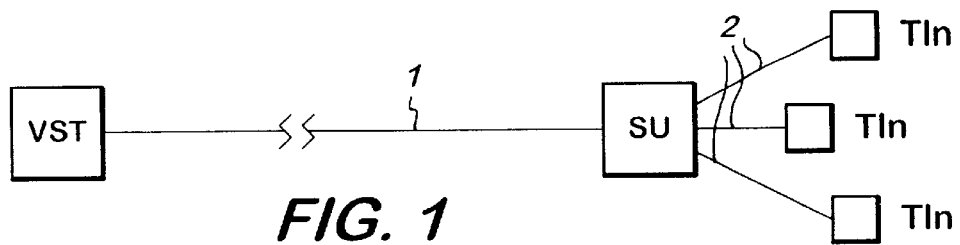
FIG. 1 is a schematic block diagram of a digital transmission path.

Referring to FIG. 1, a section of a telephone network is illustrated. A cable 1 connects subscribers Tln to an exchange VST. An interface unit SU is connected into the transmission path in the subscriber Tln area. On the exchange VST side, the interface unit SU has a digital interface with the digital telecommunication via the cable 1. The subscribers Tln are connected to the interface unit SU via analog interfaces, namely via electric service lines 2.

Figure 2:
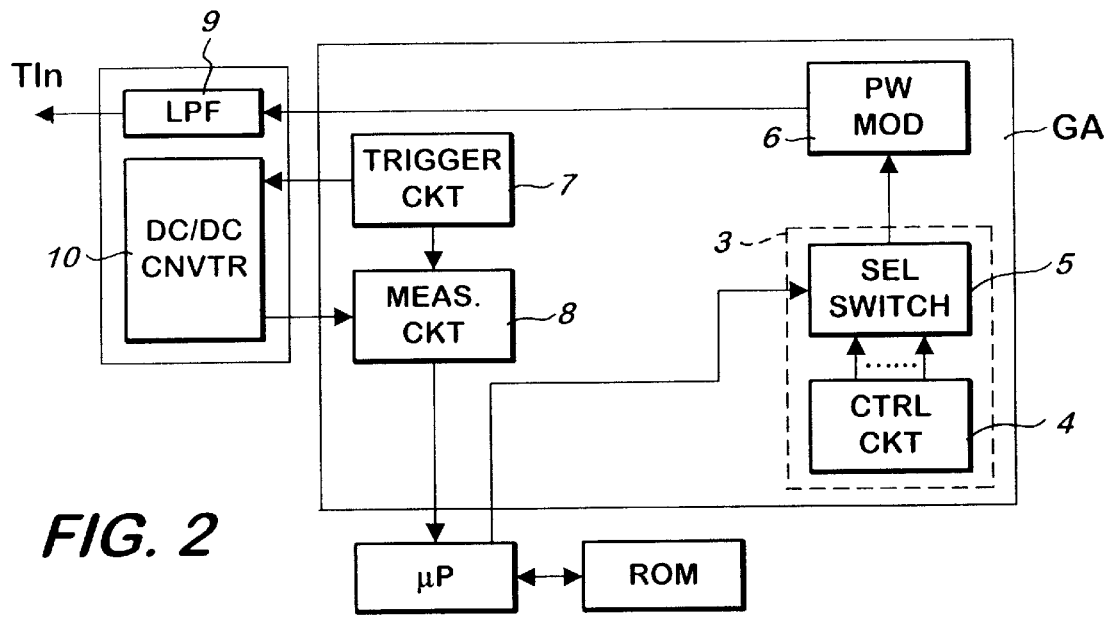
FIG. 2 is a schematic block diagram of a portion of the circuit arrangement of the invention utilized in an interface unit of the transmission path of FIG. 1.
Figure 3:
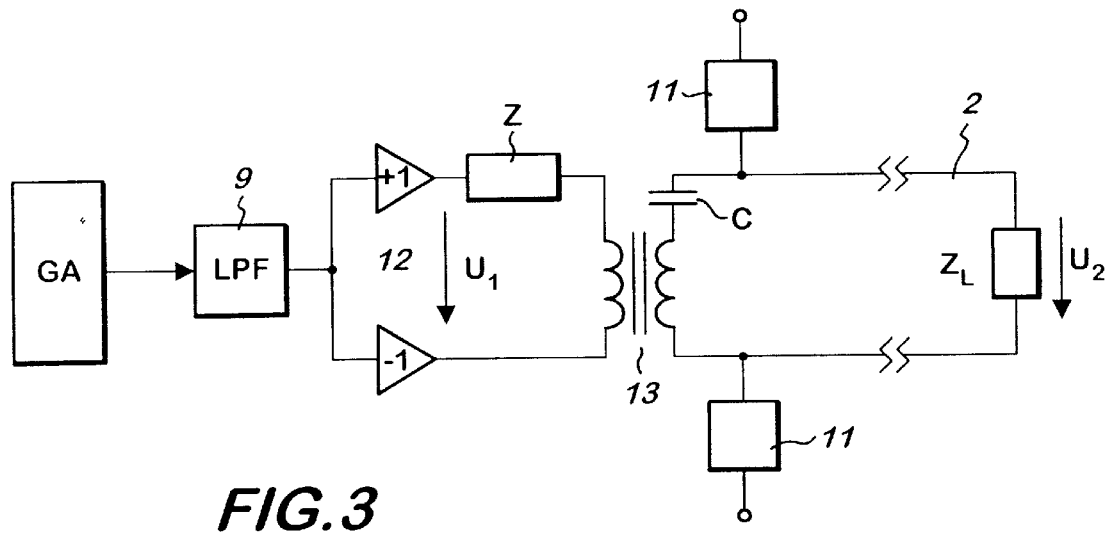
FIG. 3 is a schematic block diagram of another portion of the circuit arrangement.

FIGS. 2 and 3 more precisely illustrate a possible configuration of the interface unit SU. Referring to FIGS. 2 and 3, a gate array GA is an intelligent component of the interface unit SU, containing a generating circuit 3 for producing charge pulses, which is outlined by broken lines. The generating circuit 3 includes a number of sine tables, a control circuit 4 and a selector switch 5. In addition, the gate array GA includes a pulse-width modulator 6, a trigger circuit 7 and a measuring circuit 8. The measuring circuit 8 is connected to a microprocessor μP with access to a ROM. The analog interface from the interface SU to the subscriber Tln includes a low-pass filter (LPF) 9 and a DC voltage transformer 10 (DC/DC converter 10). The low-pass filter 9 is connected to the pulse-width modulator 6. The DC/DC converter 10 is connected to the trigger circuit 7 and the measuring circuit 8.

Referring to FIG. 3, an amplifier 12, having two outputs for a low frequency NF signal, is connected to the low-pass filter 9. An alternating voltage $U_1$ for providing charge pulses is produced across the two outputs of the amplifier 12. The internal resistance of the circuit is determined by a terminating impedance Z. A transformer 13 is used for galvanic decoupling. On the secondary side, the service line 2 of a subscriber Tln, which is symbolized by the impedance $Z_L$, is connected to the transformer 13. The subscriber Tln connection is fed by a power source 11. An alternating voltage $U_2$ provided to the subscriber Tln is adjusted by the present circuit arrangement for the correct value, which is a function of the service line 2 length. A capacitor C is used to decouple the DC of transformer 13.

The circuit according to FIGS. 2 and 3 functions as follows: An indirect measuring method is used to adapt the level of the charge pulses to the length of the service line 2 of a subscriber Tln. To that end the loop resistance of the service line 2 is estimated from the required supply voltage of the power source 11. The result is a reference value for the length of the service line 2 and its damping properties.

To minimize power loss, the supply voltage for the power source 11 in FIG. 3 can be generated by the pulsed DC/DC converter 10, which is synchronized by a pulse, for example from the trigger circuit 7 (having a switching frequency of about 93 kHz). The DC/DC converter 10 autonomously provides the required voltage by allowing a transistor to remain turned on for a predetermined time after the trigger pulse. In that case the longer the on-period, the higher the voltage.

This on-period of the transistor in the DC/DC converter 10 can be determined by the gate array GA with the help of the measuring circuit 8, in that a counter begins with "0" at the start of the pulse and stops at the end of the pulse. The microprocessor μP reads the counter position from the gate array GA in order to perform a lookup in the ROM for a suitable value for the amplitude of the charge pulse to be generated. The assignment of the measured values (counter position) to predetermined amplitudes can be adjusted, for example with reference to a model in the laboratory. The microprocessor μP uses the determined amplitude to adjust the selector switch 5 in the generating circuit 3 of the gate array GA in a way so that the charge pulse has the correct level when it arrives at the respective subscriber Tln. This applies equally to all the subsequent charge pulses of this subscriber Tln.

The generating circuit 3 in the gate array GA for example contains eight different sine tables with eight linear stepped signal amplitudes. The microprocessor μP can select a table with the suitable amplitude value for the subscriber Tln by means of the selector switch 5. Each of the eight tables approximates a period of a sine-wave oscillation by discretion, for example in 32 time steps. Each time step is assigned a numeric value which represents the height of the sine curve at this point in time. The circuit in the gate array GA reads these numeric values in cycles, by starting again at "1" after time step "32". The pulse-width modulator 6 enables the reconversion of the numeric values into a continuous analog sine-wave oscillation with the help of the low-pass filter 9.

According to FIG. 3 the insertion of the charge pulse takes place via the low-pass filter 9, which changes the pulses coming from the gate array GA into a sine-wave oscillation, and via the NF (low frequency) outputs of amplifier 12 between which the alternating voltage $U_1$ is generated. In order to attain adaptation, the value of the terminating impedance Z is chosen so that it simulates the impedance $Z_L$ in the service line of the respective subscriber within the speech frequency band (300 Hz to 3400 Hz). In Germany this value in the speech frequency band is 900 Ohm, complex. With the charge frequency of 16 kHz, the impedance $Z_L$ of a maximum length service line has a value of about 200 Ohm. The terminating impedance Z then has a value of about 240 Ohm, so that the required adaptation remains. The voltage $U_2$ is then about $U_1/2$. The control range of the power source 11 has not been exceeded.

If a telephone is directly wired to the interface unit SU and has an internal resistance in the speech band that is also adapted, but which can have a very high impedance at 16 kHz ($Z_L \to \infty$), in the extreme case no-load running takes place on the right side of transformer 13. $U_2$ would then equal $U_1$. The circuit would therefore not be adapted. Depending on the length of the service line, $Z_L$ can also assume values between the two above-described extreme cases, $U_2=U_1/2$ and $U_2=U_1$, with a more or less good adaptation by means of the conventional technology. By detecting the length of service line 2, the present circuit arrangement achieves the correct range of the charge pulse level in all cases.

Figure 4:
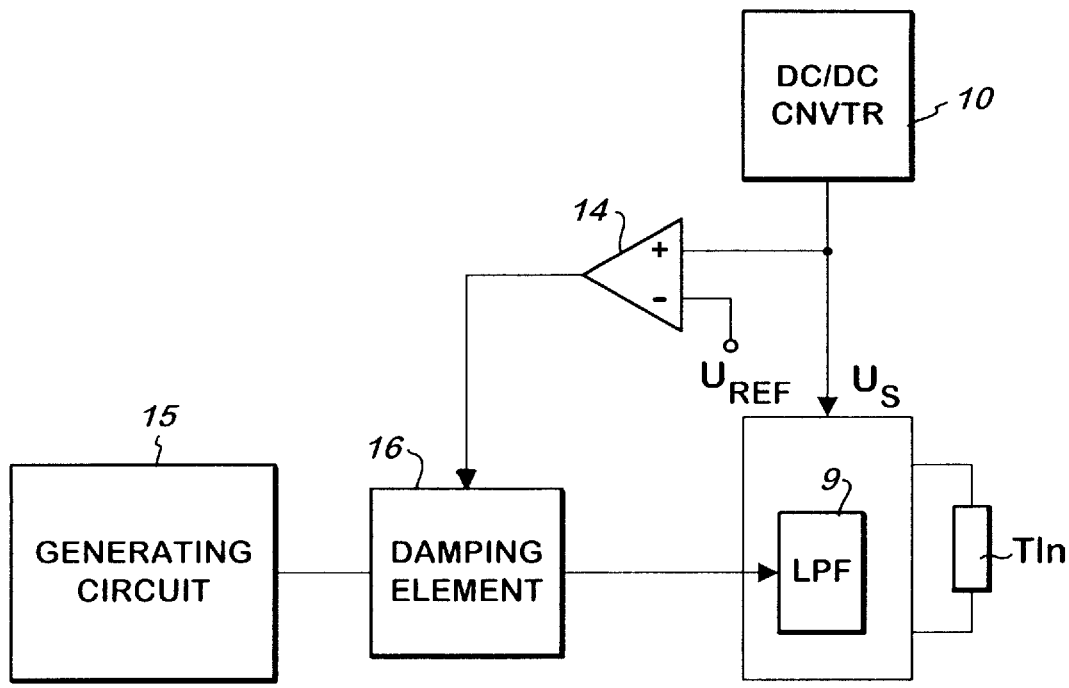
FIGS. 4 and 5 are schematic block diagrams of a second embodiment of the circuit arrangement of FIGS. 2 and 3.
Figure 5:
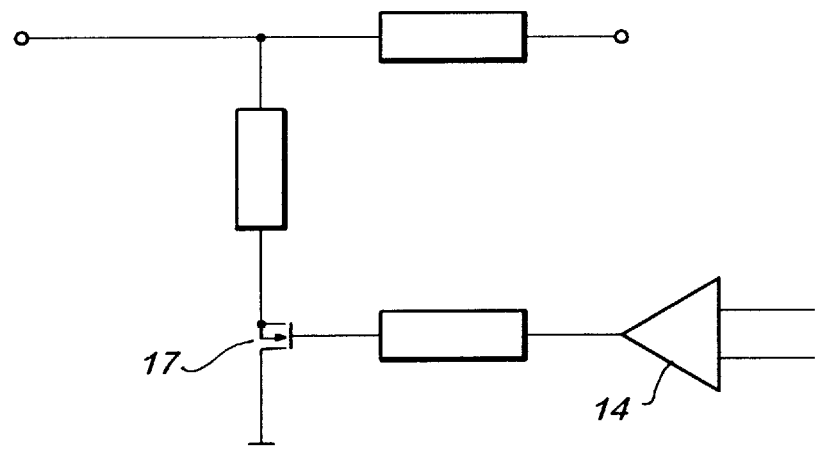

FIGS. 4 and 5 illustrate a simplified circuit arrangement configuration which deviates from those in FIGS. 2 and 3. The comparator 14 used here allows the adjustment of two different charge pulse levels. One level for example corresponds to the maximum possible length of service line 2. The other level is established for example for about ⅓ of the maximum length of service line 2.

The DC/DC converter 10 provides the supply voltage $U_s$ for the respective subscriber Tln, which is controlled as a function of the length of service line 2. On the one hand, the supply voltage $U_s$ is available in the electric circuit of the subscriber Tln in FIG. 3. On the other it is supplied to one of the inputs of comparator 14. The second input of comparator 14 has a reference voltage $U_{ref}$ which corresponds to the reduced charge pulse level. The maximum charge pulse level from a generating circuit 15 that produces a fixed level is supplied to the low-pass filter 9 for lengths of the service line 2 which exceed ⅓ of the maximum length.

For shorter lengths of the service line, the comparator 14 turns on a switchable damping element 16, whereby the charge pulse level is limited to the reduced value. According to FIG. 5, the damping element 16 can contain a field effect transistor 17 for example, whose capacity to transmit current is changed by the comparator 14. The other operating modes of the circuit arrangement according to FIGS. 4 and 5 correspond to the operating modes described by FIGS. 2 and 3.

The preferred embodiment described above admirably achieves the objects of the invention. However, it will be appreciated that departures can be made by those skilled in the art without departing from the spirit and scope of the invention which is limited only by the following claims.

What is claimed is:

1. An interface unit circuit arrangement for controlling a voltage level of charge pulses during digital telecommunications, the interface unit including
   at leach one analog interface connected to a subscriber telephone by an electric service line,
   a digital interface connected to a central exchange by cables, and a generating circuit for producing the charges pulses as a function of signals transmitted by the exchange, the charge pulses being trarsmitted to a respective subscriber telephone, the circuit arrangement comprising:
   means for measuring a service line voltage across the service line associated with the respective subscriber telephone when loop current flows through an electric circuit of the respective subscriber Telephone, said service line voltage being derived from a required supply voltage of a power source connected to the service line and said service line voltage being proportional to a length of the service line, and
   means responsive to said service line voltage, for adjusting the voltage level of the charge pulses produced by the generating circuit.

2. An interface unit circuit arrangement as claimed in claim 1, wherein a signal indicative of said service line voltage is supplied to a processor ($\mu$P) containing a comparison table which corresponds to different lengths of the service line (2), and said processor issues a command to the generating circuit (3) which corresponds to a required voltage level for the voltage level of the charge pulses.

3. An interface unit circuit arrangement as claimed in claim 1, wherein said service line voltage is supplied to a comparator whose output is connected to the generating circuit via a switchable damping element.

4. An interface unit circuit arrangement as claimed in claim 1, wherein a signal indicative of said service line voltage is supplied to a processor ($\mu$P) containing a comparison table which corresponds to different lengths of the service line (2), and said processor issues a command to the generating circuit (3) which corresponds to a required voltage level for the voltage level of the charge pulses.

5. An interface unit circuit arrangement as claimed in claim 1, wherein said service line voltage is supplied to a comparator whose output is connected to the generating circuit via a switchable damping element.

6. An interface unit for providing charge pulses to a subscriber telephone, comprising
   at least one analog interface connected to a subscriber telephone by an electric service line,
   a digital interface connected to an exchange,
   a generating circuit for producing the charge pulses as a function of signals transmitted by the exchange, the charge pulses being transmitted to the subscriber telephone via the service line,
   measuring means for measuring a service line voltage across the service line associated with the subscriber telephone when loop current flows through an electric circuit of the subscriber telephone, said service line voltage being derived from a required supply voltage of a power source connected to the service line, and said service line voltage being proportional to a length of the service line, and
   adjusting means, responsive to said service line voltage, for adjusting the voltage level of the charge pulses produced by the generating circuit.

7. An interface unit as claimed in claim 6, wherein a signal indicative of said service line voltage is supplied to a processor ($\mu$P) containing a comparison table which corresponds to different lengths of the service line (2), and said processor issues a command to the generating circuit (3) which corresponds to a required voltage level for the voltage level of the charge pulses.

8. An interface unit as claimed in claim 6, wherein said service line voltage is supplied to a comparator whose output is connected to the generating circuit via a switchable damping element.

9. An interface unit as claimed in claim 6, wherein a signal indicative of said service line voltage is supplied to a processor ($\mu$P) containing a comparison table which corresponds to different lengths of the service line (2), and said processor issues a command to the generating circuit (3) which corresponds to a required voltage level for the voltage level of the charge pulses.

10. An interface unit as claimed in claim 6, wherein said service line voltage is supplied to a comparator whose output is connected to the generating circuit via a switchable damping element.

11. An interface unit as claimed in claim 10, wherein said switchable damping element is a Field sffect Transistor (FET).

* * * * *

UNITED STATES PATENT AND TRADEMARK OFFICE
CERTIFICATE OF CORRECTION

PATENT NO. : 5,862,213
DATED : January 19, 1999
INVENTOR(S) : Werner Klamt and Thomas Bratschke It is certified that error appears in the above-identified patent and that said Letters Patent is hereby corrected as shown below:

In column 5, line 16 (claim 1, line 15), "Telephone" should be --telephone--.

In column 5, line 19 (claim 1, line 18), after "line", --,-- should be inserted.

In column 5, line 21 (claim 1, line 20), after "means", --,-- should be inserted.

In column 6, line 42 (claim 11, line 2), "sffect" should be --Effect--.

Signed and Sealed this

Thirteenth Day of July, 1999

Q. TODD DICKINSON

Attest:

Attesting Officer

Acting Commissioner of Patents and Trademarks